United States Patent [19]

Fromwiller

[11] Patent Number: 5,916,964
[45] Date of Patent: Jun. 29, 1999

[54] REACTIVE HOT MELT ADHESIVES

[75] Inventor: John Fromwiller, Cary, N.C.

[73] Assignee: Reichhold Chemicals, Inc., Durham, N.C.

[21] Appl. No.: 08/989,603

[22] Filed: Dec. 12, 1997

Related U.S. Application Data

[60] Provisional application No. 60/052,480, Jul. 14, 1997.

[51] Int. Cl.$^6$ .............................. C08J 3/00; C08K 3/20; C08L 75/00; B32B 27/00

[52] U.S. Cl. ...................... 524/590; 428/423.1; 524/588; 525/455; 528/28

[58] Field of Search .................................... 524/590, 588; 428/423.1; 528/28; 525/455

[56] References Cited

U.S. PATENT DOCUMENTS

| | | | |
|---|---|---|---|
| 3,931,077 | 1/1976 | Uchigaki et al. | 260/26 |
| 4,585,819 | 4/1986 | Reischle et al. | 524/196 |
| 4,808,255 | 2/1989 | Markevka et al. | 146/307 |
| 5,520,980 | 5/1996 | Morgan et al. | 428/246 |
| 5,539,045 | 7/1996 | Potts et al. | 524/588 |
| 5,558,941 | 9/1996 | Stobbie, IV et al. | 428/423.1 |
| 5,731,397 | 3/1998 | Primeaux, II et al. | 528/73 |

*Primary Examiner*—Patrick D. Niland
*Attorney, Agent, or Firm*—Myers Bigel Sibley & Sajovec

[57] ABSTRACT

The reactive hot melt adhesive of the present invention comprises 40 to 60 percent by weight of a polytetramethylene ether glycol or derivative thereof, 1 to 10 percent by weight of a polyether polyol, 0 to 15 percent by weight of a hydrolytically stable polyester polyol, 0.5 to 3.0 percent by weight of a silane, and 10 to 30 percent by weight of an organic polyisocyanate.

19 Claims, No Drawings

REACTIVE HOT MELT ADHESIVES

This application claims benefit of Provisional Application 60/052,480 filed Jul. 14, 1997.

BACKGROUND AND FIELD OF THE INVENTION

The present invention relates to a hot melt adhesive, and particularly a reactive hot melt adhesive having improved hydrolytic stability.

Hot melt adhesives are a well known class of adhesives. Typically these adhesives are applied in a molten form, cooled to solidify and cured using a crosslinking reaction. Of particular interest are the reactive urethane hot melt adhesives. Such reactive urethane hot melt adhesives, however, have little green strength, and, the substrate or workpiece often must be supported until the adhesive can cure to a crosslinked bond. Such adhesives also tend to be unstable in the presence of water and solvents. Thus, there is a need for a reactive polyurethane hot melt adhesive that has a high initial green strength, and is stable, particularly is hydrolytically stable.

With respect to the reactive urethane hot melt adhesives and such adhesives having high initial green strength, a number of urethane compositions have been proposed. For example, U.S. Pat. No. 3,931,077 to Uchigaki et al. proposes a high viscosity hot melt adhesive composition comprising a reactive urethane prepolymer, a specific ethylene-vinyl acetate theremoplastic polymer and a phenolic or abietic acid type tackifying resin.

U.S. Pat. No. 4,585,819 to Reischle et al. proposes a hot melt adhesive composition comprising an isocyanate prepolymer, a thermoplastic polyurethane or polyester and a low molecular weight synthetic resin such as ketone resins or hydrogenation products of acetophone condensation products.

U.S. Pat. No. 4,808,255 to Markevka et al. proposes a urethane prepolymer which is a reaction product of a polyester polyol and isocyanate composition, a tackifier resin and an ethylene-vinyl monomer thermoplastic copolymer resin.

U.S. Pat. No. 5,558,941 to Stobbie, IV et al. proposes a blend of isocyanate-terminated polyurethane prepolymers consisting of a first crystalline prepolymer based on polyhexamethylene adipate and a second prepolymer based on polytetramethylene ether glycol.

There, however, remains a need for reactive hot melt adhesive having both a high initial green strength and excellent hydrolytic stability.

SUMMARY OF THE INVENTION

To this end, the present invention provides a reactive hot melt adhesive which is a low viscosity product that has good initial strength. This facilitates avoiding tunneling and delamination when lamination equipment is stopped.

The reactive hot melt adhesive of the present invention comprises 40 to 60 percent by weight of a polytetramethylene ether glycol or derivative thereof, 1 to 10 percent by weight of a polyether polyol, 0 to 25 percent preferably 1 to 25 percent by weight of a hydrolytically stable polyester polyol, 0.5 to 3.0 percent by weight of a silane, and 10 to 30 percent by weight of an organic polyisocyanate. Optionally, defoamers, fillers and conventional additives such as plasticizers, tackifiers, anti-oxidants, pigments, stabilizers, etc. may be included.

DETAILED DESCRIPTION OF THE INVENTION

As discussed above, it has been discovered that a reactive hot melt adhesive having improved initial green strength and hydrolytic stability can be obtained via a composition comprising 40 to 60 percent by weight of a polytetramethylene ether glycol or derivative thereof, 1 to 10 percent by weight of a polyether polyol, 0 to 25 preferably 1 to 25 percent by weight of a hydrolytically stable polyester polyol, 0.5 to 3.0 percent by weight of a silane, and 10 to 30 percent by weight of an organic polyisocyanate. Optionally, defoamers, fillers and conventional additives such as plasticizers, tackifiers, anti-oxidants, pigments, stabilizers, etc. may be included.

The adhesive of the invention retains excellent hydrolytic stability when cured. The reactive hot melt adhesive is particularly useful to bond dissimilar and similar materials together. Exemplary materials include textiles (e.g., cloth, fabric, etc.), films, wood, metal, etc. Particularly commercially significant products are fabric laminates having two or more layers bonded together such as those used by the medical industry as garments. Such garments must be able to withstand at least 100 autoclave cycles. The term "garment" is intended to mean any type of apparel including diapers, incontinence apparel, surgical gowns, head coverings, face masks, booties, gloves, socks, pants, shirts, jackets, robes, underwear and the like. These garments are typically formed from so-called "barrier fabrics." Such fabrics are relatively impermeable to the transmission of fluids particularly body fluids, but are also breathable. An exemplary fabric is a layered construction of an elastomeric meltblown thermoplastic, a liquid impermeable film and a liquid permeable material such as described in U.S. Pat. No. 5,520,980 to Morgan et al. the disclosure of which is incorporated herein by reference in its entirety. Layered constructions can be held together by the reactive hot melt adhesive of the invention.

Polytetramethylene ethylene glycol is sometimes referred to as poly THF. Poly THF typically is produced by the cationic polymerization of tetrahydrofuran. Derivatives can be prepared by incorporating other monomer materials in the polymerization mixture. An example of another monomer is ethylene oxide. An example of a commercially available THF is Terathane 2000 available from DuPont, Wilmington, Del.

Suitable polyether polyols include those prepared by polymerizing an alkylene oxide in the presence of a difinctional or trifunctional initiator compound. Examples of such polyols include polyethyleneoxy polyols, polypropyleneoxy polyols, polybutyleneoxy polyols, and block copolymers of ethylene oxide and propylene oxide. Preferably, the polyether polyol is a polypropyleneoxy polyol, or a block copolymer of ethylene oxide and propylene oxide, and is most preferably a polypropyleneoxy polyol or a block copolymer of ethylene oxide and propylene oxide. A particularly suitable polyether polyol is Voranol 230–238 available from The Dow Chemical Company, Midland, Michigan.

Suitable hydrolytically stable polyester polyols include polyesters formed from a glycol and a saturated polyfunctional dicarboxylic acid such as prepared by reacting hexanediol with dodecanedioic acid. A particularly preferred polyester polyol is Dynacoll 7380 available from HULS America, Piscataway, N.J.

Suitable silanes are ethylenically unsaturated silanes which will participate directly in the reaction by free-radical polymerization and which do not contain active hydrogen.

Representative commercially available silanes of this type include vinyltrichlorosilane, vinyltriethoxysilane, vinyltrimethoxysilane, vinyltris(2-methoxyethoxy)silane, 3-methacryloxypropyltrimethoxysilane, 3-methacryloxypropyltris(2-methoxyethoxy)silane, vinyltriacetoxysilane, 4-(3-trimethethoxysllylpropyl-benxylstyrene sulfonate, 3-acryloxypropyltrimethoxysilane, allyltriethoxysilane, allyltrimethoxysilane, vinylmethyldiethoxysilane, vinyldi-methylethoxysilane, vinylmethyldiacetoxysilane, 3-methyacryloxypropylmethyl-diethoxysilane, 3-acryloxypropyldimethylmethoxysilane, and phenylaminopropyl-trimethoxysilane, etc. A particularly suitable silane is Silquest Y-9669 available from OSI Specialties, Inc., Danbury, Conn.

Suitable organic polyisocyanates include ethylene diisocyanate, ethylidene diisocyanate, propylene diisocyanate, butylene diisocyanate, hexamethylene diisocyanate, toluene diisocyanate, cyclopentylene-1,3,-diisocyanate, cyclohexylene-1,4diisocyanate, cyclohexylene-1,2-diisocyanate, 4,4'-diphenylnethane diisocyanate ("MDI"), 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate,diphenylsulphone-4,4'-diisocyanate, dichlorohexamethylene diisocyanate, furfurylidene diisocyanate, 1 -chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenylmethane-2,2',5,5-tetraisocyanate, and the like. A particularly preferred polyisocyanate is Isonate 2125M MDI available from Dow Chemical, Midland, Mich.

The adhesive may be used to bond substrates by heating the adhesive prior to application and then applying it by an suitable method. For example, the adhesive may be placed in an extrusion apparatus which can dispense the adhesive in a molten state. The adhesive may be extruded in any suitable size or shaper at any suitable speed, depending of course, on the bonding application for which it is employed. After the adhesive is applied, it quickly cools to ambient temperature and provides sufficient bonding to provide an initial "green strength" before the adhesive cures completely in the presence of moisture (e.g., steam).

A catalyst may be included in the reaction mixture to prepare the compositions of this invention. Any of the catalysts known in the art to catalyze the reaction of an isocyanate with a reactive hydrogen may be employed. Representative catalysts include organoetallic catalysts such as stannous octoate, stannous oleate, bismuth octoate, dibutyline dioctoate, dibutyline dilaurate, and the like. Catalysts are typically used in amounts ranging from 0.01 to 2 percent by weight.

The reactive hot melt adhesive compositions of the invention optionally may contain filler to modify the rheological properties such as viscosity sag resistance and flow rate of the adhesive. Such materials include for example carbon black, surface-treated fumed silicas, titanium dioxide, silicas, calcium carbonate, talc, mica, aluminum oxide, clays, ultraviolet stabilizers antioxidants and glass phenolic or aluminum oxide bubbles. When talc, mica, or a mixtures thereof are used it is preferably used in an amount based on the weight of the adhesive, of from about 1 percent to about 30 percent.

The following examples illustrate specific embodiments of the present invention. In the examples and throughout the specification, all parts and percentages are by weight, unless otherwise indicated

EXAMPLES

Example 1

The following are charged to a vessel under nitrogen and heated with mixing to 190°–200° F.; 238.4g Terathane 2000, 20.0g Voranol 230–238, 48.0g Dynacoll 7380, and 0.4 BYK070 defoamer (available from BYK Chenie, Wallingford, Conn. Once at temperature, 86.0 g MDI is added to the can and allowed to be held at 220° to 240° F. for one hour. The product is then cooled to 210 to 220° F, Silquest Y9669 is added, and mixed 10–15 minutes. Stirring is stopped, the can is held at 250° F. for 60 minutes, and properties are checked. Typical properties are: 1900 cps@250° F., 2.25 minutes open time, and 50+psi initial strength in two minutes. At this time a 5–10 mil film is drawn down and allowed to cure one week. After a week or greater, 0, 12, and 18 hours at 262° F./21 psi tensile strengths are determined and % tensile strength retained is calculated as 100 after 0 hours; 92 after 12 hours and 69 after 18 hours.

The resulting reactive hot melt adhesive has the following properties:

Viscosity 1800 cps at 250° F.

Tensile Strength 3200 psi

Elongation 600%

2% Secant Modulus 10,000 psi

Open Time 2.0 to 2.5 minutes

Green Strength (sec) 30 psi at 30s 35 psi at 60s

50+psi at 180s

Examples 2–5

In order to demonstrate the improvement due to the addition of the silane with respect to hydrolytic stability, four hot melt adhesive compositions were formulated with varying amounts of silane.

|  | Examples (% By Weight) | | | |
| --- | --- | --- | --- | --- |
| Component | 2 | 3 | 4 | 5 |
| Terathane 2000 | 61.90 | 60.90 | 59.60 | 57.90 |
| Voranol 230–238 | 5.00 | 5.00 | 5.00 | 5.00 |
| Dynacoll 738D | 12.00 | 12.00 | 12.00 | 12.00 |
| BYK 070 | 0.10 | 0.10 | 0.10 | 0.10 |
| Silquest Y-9689 | 0.00 | 1.00 | 1.80 | 3.00 |
| MDI | 21.00 | 21.00 | 21.50 | 22.50 |

Tensile strengths at break were measured using a Model 4207 Instron equipped with a 100 pound load cell. The dogbone samples which were about 0.010 inches thick and 1.5 inches in length were pulled at 5 inches per minute. The data obtained was an average of four to five samples.

|  | Examples | | | |
| --- | --- | --- | --- | --- |
|  | 2 | 3 | 4 | 5 |
| 12 Hours | 18 | 13 | 8 | 6 |
| 18 Hours | 42 | 42 | 31 | 27 |

The results illustrate that substantial improvement in hydrolytic stability can be obtained by using from up to 3.0 percent silane.

The present invention has been described in detail above. This invention may, however, be embodied in many different forms and should not be construed as limited to the embodiments set forth herein above; rather, these embodiments are provided so that this disclosure will be thorough and complete, and will fully convey the scope of the invention to those skilled in the art.

That which is claimed:

1. A reactive hot melt adhesive composition comprising a reacted urethane component having:

40 to 80 percent by weight of a polytetramethylene ether glycol or derivative thereof.

1 to 10 percent by weight of a polyether polyol;

1 to 25 percent by weight of a hydrolytically stable polyester polyol; and 10 to 30 percent by weight of an organic polyisocyanate and 0.5 to 5 percent by weight of a silane component which is ethylenically unsaturated and can participate directly in free radical polymerization when reacted with the urethane.

2. The reactive hot melt adhesive composition according to claim 1 wherein said polyether polyol is selected from the group consisting of polyethyleneoxy polyols, polypropyleneoxy polyols, polybutyleneoxy polyols, and block copolymers of ethylene oxide and propylene oxide.

3. The reactive hot melt adhesive composition according to claim 2 wherein said polyether is a polyethertriol.

4. The reactive hot melt adhesive composition according to claim 1 wherein said hydrolytically stable polyester polyol is formed from a glycol and a saturated polyfunctional dicarboxylic acid.

5. The reactive hot melt adhesive composition according to claim 4 wherein said hydrolytically stable polyester polyol is formed from hexanediol and dodecanedioic acid.

6. The reactive hot melt adhesive composition according to claim 1 wherein said silane is selected from the group consisting of vinyltrichlorosilane, vinyltriethoxysilane, vinyltrimethoxysilane, vinyltris(2-methoxyethoxy)silane, 3-methacryloxypropyltrimethoxysilane, 3-methacryloxypropyltris(2-methoxyethoxy)silane, vinyltriacetoxysilane, 4-(3-trimethethoxysllylpropyl-benxylstyrene sulfonate, 3-acryloxypropyltrimethoxysilane, allyltriethoxysilane, allyltrimethoxysilane, vinylmethyldiethoxysilane, vinyldimethylethoxysilane, vinylmethdydiacetoxysilane, 3-methyacryloxypropylmethyldiethoxysilane, 3-acryloxypropyldimethylmethoxysilane and phenylaminopropyltrimethoxylsilane, etc.

7. The reactive hot melt adhesive composition according to claim 6 wherein the silane is a phenylaminopropyltri-methoxylsilane.

8. A reactive hot melt adhesive composition comprising a reacted urethane component comprising:

40 to 80 percent by weight of a polytetramethylene ether glycol or derivative thereof.

1 to 10 percent by weight of a polyether polyol;

1 to 25 percent by weight of a hydrolytically stable polyester polyol; and 10 to 30 percent by weight of an organic polyisocyanate; and 0.5 to 5 percent by weight of a silane component which is ethylenically unsaturated and can participate directly in free radical polymerization when reacted with the urethane.

9. The reactive hot melt adhesive composition according to claim 8 wherein said polyether polyol is selected from the group consisting of polyethyleneoxy polyols, polypropyleneoxy polyols, polybutyleneoxy polyols, and block copolymers of ethylene oxide and propylene oxide.

10. The reactive hot melt adhesive composition according to claim 9 wherein said polyether is a polyetherthriol.

11. The reactive hot melt adhesive composition according to claim 8 wherein said silane is selected from the group consisting of vinyltrichlorosilane, vinyltriethoxysilane, vinyltrimethoxysilane, vinyltris(2-methoxyethoxy)silane, 3-methacryloxypropyltrimethoxysilane, 3-methacryloxypropyltris(2-methoxyethoxy)silane, vinyltriacetoxysilane, 4-(3-trimethethoxysllylpropyl-benxylstyrene sulfonate, 3-acryloxypropyltrimethoxysilane, allyltriethoxysilane, allyltrimethoxysilane, vinylmethyldiethoxysilane, vinyldimethylethoxysilane, vinylmethdydiacetoxysilane, 3-methyacryloxypropyl-methyldiethoxysilane, 3-acryloxypropyldimethylmethoxysilane and phenylaminopropyltrimethoxylsilane, etc.

12. The reactive hot melt adhesive composition according to claim 11 wherein the silane is a phenylaminopropyltri-methoxylsilane.

13. A garment having a layered construction wherein two or more layers thereof are bonded together using a reactive hot melt adhesive comprising:

40 to 80 percent by weight of a polytetramethylene ether glycol or derivative thereof.

1 to 10 percent by weight of a polyether polyol;

1 to 25 percent by weight of a hydrolytically stable polyester polyol; and 10 to 30 percent by weight of an organic polyisocyanate; and 0.5 to 5 percent by weight of a silane component which is ethylenically unsaturated and can participate directly in free radical polymerization when reacted with the urethane.

14. The garment accoring to claim 13 wherein said polyether polyol is selected from the group consisting of polyethyleneoxy polyols, polypropyleneoxy polyols, polybutyleneoxy polyols, and block copolymers of ethylene oxide and propylene oxide.

15. The garment according to claim 14 wherein said polyether is a polyethertriol.

16. The garment according to claim 13 wherein said hydrolytically stable polyester polyol is formed from a glycol and a saturated polyfunctional dicarboxylic acid.

17. The garment according to claim 13 wherein said hydrolytically stable polyester polyol is formed from hexanediol and dodecanedioic acid.

18. The garment according to claim 13 wherein said silane is selected from the group consisting of vinyltrichlorosilane, vinyltriethoxysilane, vinyltrimethoxysilane, vinyltris(2-methoxyethoxy)silane, 3-methacryloxypropyltrimethoxysilane, 3-methacryloxypropyltris(2-methoxyethoxy)silane, vinyltriacetoxysilane, 4-(3-trimethethoxysllylpropyl-benxylstyrene sulfonate, 3-acryloxypropyltrimethoxysilane, allyltriethoxysilane, allyltrimethoxysilane, vinylmethyldiethoxysilane, vinyldi-methylethoxysilane, vinylmethdydiacetoxysilane, 3-methyacryloxypropyl-methyl-diethoxysilane, 3-acryloxypropyldimethylmethoxysilane and phenylaminopropyltrimethoxylsilane, etc.

19. The garment according to claim 18 wherein the silane is a phenylaminopropyltrimethoxylsilane.

* * * * *